Figure 3:
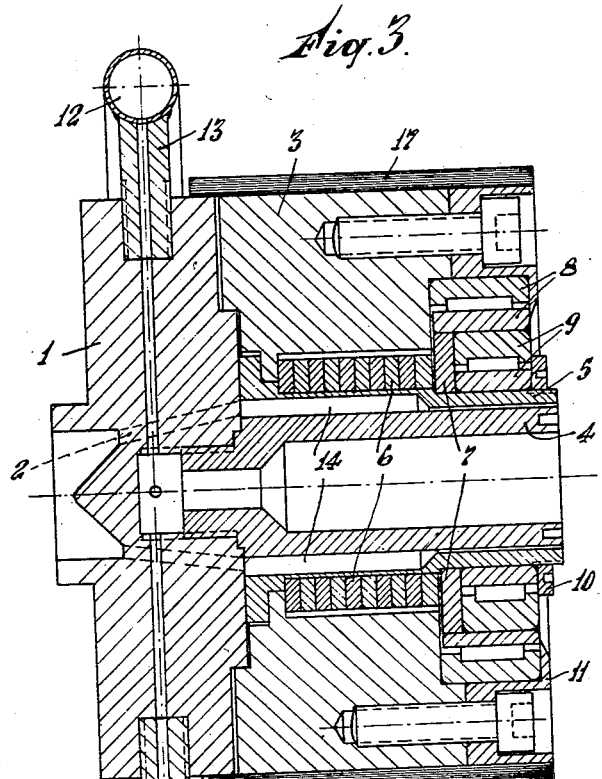

Sept. 10, 1957  O. F. BARTOO  2,805,446
EXTRUSION HEAD OF AN APPARATUS FOR THE MANUFACTURE
OF TUBES OR HOSES FROM PLASTIC MATERIAL
Filed Dec. 7, 1954  2 Sheets-Sheet 1
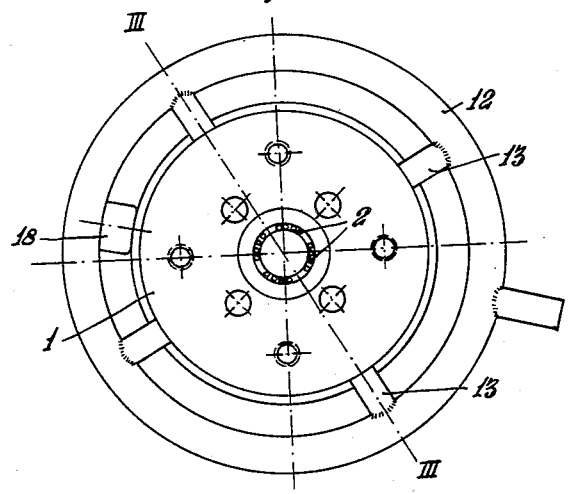
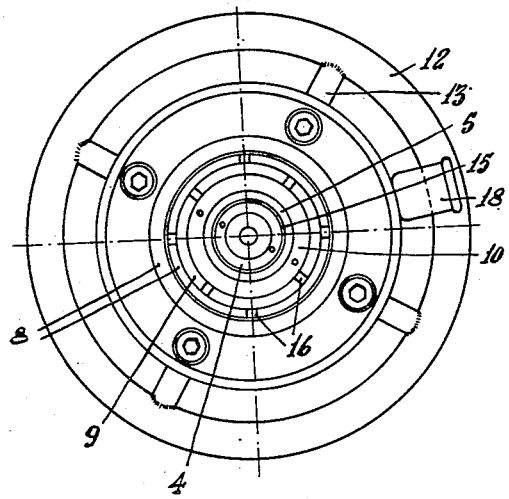
INVENTOR.
OTTO FLORIS BARTOO
BY
ATTORNEYS Sept. 10, 1957  O. F. BARTOO  2,805,446
EXTRUSION HEAD OF AN APPARATUS FOR THE MANUFACTURE
OF TUBES OR HOSES FROM PLASTIC MATERIAL
Filed Dec. 7, 1954  2 Sheets-Sheet 2

INVENTOR.
Otto Floris Bartoo
BY
Attorneys

United States Patent Office 2,805,446
Patented Sept. 10, 1957

2,805,446

EXTRUSION HEAD OF AN APPARATUS FOR THE MANUFACTURE OF TUBES OR HOSES FROM PLASTIC MATERIAL

Otto Floris Bartoo, Rijswijk, Netherlands, assignor to Nederlandse Organisatie voor Toegepast-Natuurwetenschappelijk Onderzoek ten behoeve van Nijverheid, Handel en Verkeer, The Hague, Netherlands, a corporation of the Netherlands Application December 7, 1954, Serial No. 473,581

Claims priority, application Netherlands December 16, 1953

3 Claims. (Cl. 18—14)

The invention relates to an extrusion head of an apparatus and a method for the manufacture of tubes or hoses from plastic material and to the tubes or hoses thus manufactured.

An extrusion head is known, the extrusion nozzle of which is formed by two coaxial or practically coaxial shaping members, the outer member surrounding the inner member, i. e., the free end of a so-called mandrel, in such a way that between the two members a ring-shaped outlet of any profile desired and of the width desired is formed. Through this ring-shaped outlet the plastic material is pressed so as to make profiled or non-profiled tubes or hoses. It is very difficult to secure the mandrel into such a position, that a ring-shaped outlet, the width of which is entirely uniform is realized, even if all mechanical means available are used, while, moreover, by an uneven distribution of the heating and cooling of the head and by an uneven distribution of the cooling of the extruded tube or hose or by an interrupted supply of the plastic material the wall thickness of the finished tubes or hoses in cross-section will be uneven.

In order to manufacture tubes or hoses having an even wall thickness in cross-section, the two shaping members are preferably constructed in such a way that they can be mutually adjusted, preferably during the extrusion itself. In particular in case of thin-walled tubes the mutual adjustment of the two members will have to take place accurately, the inner shaping member being adjusted with respect to the outer member or inversely.

There is known an extrusion head for the purpose mentioned above, having a cylindrical extrusion channel for passing the plastic material, the foremost end of which channel, being directed from the extrusion apparatus, is the outlet of the extrusion nozzle, said cylindrical extrusion channel being bounded at the inside by a mandrel, one end of which is firmly secured to the body of the extrusion head, the free end of said mandrel being the inner, shaping member of the extrusion nozzle, the outside of said extrusion channel being bounded by an element surrounding said mandrel, the end of said element—which is present at the foremost end of the extrusion channel— being the outer shaping member of the extrusion nozzle, which end, being a loose part, can be shifted along radial slide planes by means of radial screws, with respect to another part of this element, fixedly connected to the body of the extrusion head, so that the end can be adjusted with respect to the free end of the mandrel. When the outer shaping member is adjusted this part will consequently have to be able to slide along radial slide planes with respect to the fixed part of said element. On the one hand these slide planes must be able easily to slide over each other, on the other hand they must be pressed tightly against each other in order to prevent the plastic material, which is pressed through the extrusion head under high pressure, from penetrating between these planes, by which on the one hand the adjustment of the outer shaping member with respect to the free end of the core can be adversely affected and on the other hand the plastic material between these planes can start decomposing and crusting as a result of a prolonged presence therebetween at the high temperature employed, which has of course many disadvantages too. An adequate construction, the planes being e. g. thus smoothly polished that they can slide but do not allow extrusion masses to penetrate has in practice been hardly realizable, and will at any rate be very expensive. Furthermore, dead angles will be present in the extrusion channel of such an extrusion head, in which angles extrusion masses also remain present for a long time.

The principal object of the invention is to provide an extrusion head of this type which produces tubes or hoses of accurate diameter and wall thickness. Another object of the invention is to produce an extrusion head of this character and a method which produces a tube or hose having homogeneous walls of substantial strength. A further object of the invention is to provide an extrusion head; the clearance of its ring-shaped outlet can be adjusted locally during the extrusion operation. Still another object of the invention is to provide an extrusion head with an extrusion channel having no radial slits or dead angles. Still another object of the invention is to provide tubes or hoses of plastic material, particularly thin-walled tubes or hoses, having a homogeneous wall of the same local and regular thickness. Further objects and advantages of the invention will appear more fully from the following description, particularly when taken in conjunction with the accompanying drawings.

An extrusion head according to the invention has a cylindrical extrusion channel, the foremost part of which is the outlet of the extrusion nozzle, the inside of said extrusion channel being bounded by a mandrel, one end of which is secured to the body of the extrusion head, the free end of said mandrel being the inner shaping member of the extrusion nozzle, the outside of said extrusion channel being bounded by an element surrounding said mandrel, the end of which element, positioned at the foremost end of the extrusion channel, being the outer shaping member of the extrusion nozzle, which end can be radially adjusted with respect to the free end of the mandrel, preferably during the extrusion itself, the element surrounding the mandrel acting as a whole tubulus, at least one part of which is flexible, during the radial adjustment of the outer shaping member of the extrusion nozzle with respect to the mandrel. This tubulus may be constructed of various dismountable parts, but during the extrusion these parts act as one whole tubulus. The outer face of the tube or hose manufactured with this extrusion head from the plastic material is formed by the inner surface of the foremost end of said tubulus. On adjusting as mentioned above, this tubulus will bend, by which the outlet opening of the extrusion nozzle is regulated.

It may be of importance to construct the extrusion channel in such a way that the cross section of the part of this extrusion channel adjoining the extrusion nozzle will be equal to that of the extrusion nozzle over a considerable length.

The above drawbacks presenting themselves with the known constructions of an extrusion head do not occur with an extrusion head according to the invention, since the forces to be overcome on bending the tubulus are only small and, owing to the absence of radial sliding planes, there is no necessity for slits to be present in which the extrusion mass can enter, nor must dead angles be present in which the extrusion mass remains for a long time.

In order to be able to resist a high extrusion pressure the tubulus will have to be of a very strong, but flexible material. However, also a relatively thin-walled tubulus may be applied, which is reinforced e. g. by rings which snugly fit around the tubulus, in such a way that these rings are not clamped together but are preferably positioned just against each other; if desired, these rings may be fastened to the tubulus e. g. by welding, but they should always remain loose from each other in order not to affect the flexibility of the tubulus adversely. These rings may also slightly taper in outward direction in order to facilitate bending of the tubulus; however, the rings preferably abut on the side of their bores. Also a closely wound spiral snugly fitting around the tubulus, the cross-section of which is e. g. square or conical, the windings lying preferably against one another, can serve for the reinforcement of the tubulus; the ends of the spiral may be secured against the adjoining winding and/or against the tubulus itself.

This tubulus may be bent by means of radial adjusting screws, by which the outlet of the extrusion nozzle can be regulated, but the regulation preferably takes place by means of revolvable rings having a mutual eccentric sliding plane, e. g. ball bearing or roller bearing rings, placed round the tubulus, by which the foremost end of the tubulus is adjusted, with respect to the free end of the fixed mandrel.

The invention is further illustrated in the accompanying drawings by way of example, in which Fig. 1 represents a view of an extrusion head according to the invention, said view showing the side directed to the extrusion apparatus, Fig. 2 represents a view of this extrusion head showing the side which is directed from the extrusion apparatus, Fig. 3 is a cross-section of the extrusion head along the line III—III of Figure 1.

Figure 4:
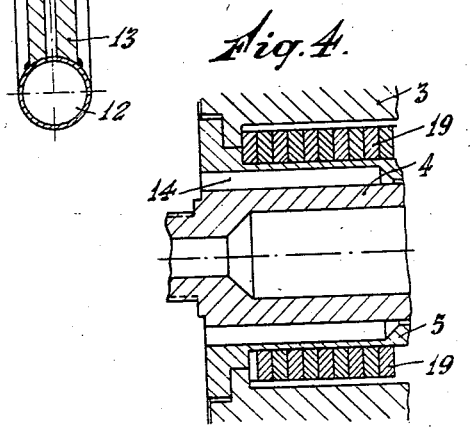

Fig. 4 is a cross-section similar to Fig. 3 illustrating a modified reinforcing means.

The fastening flange 1 of the extrusion head represented, with which flange the extrusion head is adjusted on the extrusion apparatus belonging to it, has an extrusion channel 14 with a number of sieve-holes 2, through which the extrusion mass is extruded. Mandrel 4 is screwed in the center of said flange, the free end of said mandrel being the inner shaping member of the extrusion nozzle for the shaping of the inner wall of the tube or hose to be manufactured. The mandrel is hollow in order to blow air into the tube or hose during operation. This air is supplied through ring-line 12 and four connecting passages 13. The outer shaping member of the extrusion nozzle is formed by the foremost end of the tubulus 5 surrounding mandrel 4 in such a way that a ring-shaped outlet 15 is formed between the two members. The cross-section of the tubulus is enlarged at its foremost end i. e. the end of the extrusion channel, whereas the opposite end of the tubulus has a flange by means of which the tubulus is clamped on the fastening flange 1 by part 3. The middle of the tubulus is relatively thin-walled (e. g. 0.3–0.5 mm.) and since this tubulus is made from resilient material it can be bent. Around the foremost part of the tubulus an exactly fitting inner ring of a roll bearing 9 is positioned. The outer ring of this bearing is more or less eccentrically ground. A second similar bearing 8 fits around this first roll bearing. The inner ring of said second bearing is ground eccentrically in the same degree as the outer ring of the first bearing and fits slidingly around the outer ring of the first bearing. The outer ring of the second bearing is centered in part 3. The whole is enclosed by a locking ring 11 and a lock nut 10.

When one of the eccentric rings having grooves 16 is turned, e. g. during the extrusion itself, by means of a key fitting in said grooves said grooves being provided for said purpose, the foremost end of the tubulus is compelled to make an ecentric movement around the mandrel, with the result that the outlet is locally narrowed or widened along its circumference. By rotation of the second eccentric ring a second ecentric movement of the foremost end of the tubulus is effected, which movement can even entirely balance the former eccentric movement. In the embodiment given the degree of eccentricity is thus chosen that in the last resort the outlet can be locally closed.

The force component which tends to bring the eccentric rings back into their neutral positions is exceedingly small, so that it is not necessary to steady a certain position.

The whole is surrounded by a heating element 17, provided with the female plug 18.

The thin-walled part of the tubulus, giving the tubulus its resilience, is reinforced in the way as shown, by a number of rings 6, which fits slidingly around the tubulus. They are locked, without being tightly pressed against one another, by a ring 7. By these rings which can freely be shifted with respect to one another, the flexibility of the tubulus is substantially not adversely affected, whereas they do increase the resistance against too high an extrusion pressure. In place of separate rings 6 a spiral shaped reinforcement winding 19 may be used as illustrated in Fig. 4.

When tubes or hoses with a longer diameter are manufactured the tubulus used may be longer or equally long, with the same diameter, which is, however, gradually increasing towards the end of the tubulus in which case the flexibility of the tubulus remains the same.

I claim:

1. An extrusion head for the manufacture of tubes and hose from plastic material provided witth a mandrel and with a tubular die member surrounding said mandrel and spaced therefrom in radial direction to provide at the discharge end an annular orifice between said mandrel and said die, the opposite end of said tubular die member being firmly fixed to the body of said extrusion head, a part of the length of said tubular die member being thin-walled and elastic to allow a radial displacement of the discharge end of said die member relative to said mandrel when a radial force is exerted thereupon adjacent said end to increase or decrease the opening between said mandrel and said die, and mechanical means to displace the end of said die radially and to maintain said end in the desired position.

2. An extrusion head according to claim 1, the thin-walled portion of the tubular die member being re-inforced by rings surrounding said portion.

3. An extrusion head according to claim 1, the thin-walled portion of the tubular die member being re-inforced by a spiral wound around said portion.

References Cited in the file of this patent

UNITED STATES PATENTS

| | | |
|---|---|---|
| 1,956,330 | Mullin | Apr. 24, 1934 |
| 2,091,973 | Fessler et al. | Sept. 7, 1937 |
| 2,172,243 | Goodnow et al. | Sept. 5, 1939 |
| 2,566,854 | Rhodes | Sept. 4, 1951 |
| 2,582,922 | Crowley et al. | Jan. 15, 1952 |
| 2,698,964 | Tornberg | Jan. 11, 1955 |